US011310212B2

(12) United States Patent
Gaydos et al.

(10) Patent No.: US 11,310,212 B2
(45) Date of Patent: Apr. 19, 2022

(54) SEGMENTED ENCRYPTION FOR CONTENT DELIVERY

(71) Applicant: Comcast Cable Communications, LLC, Philadelphia, PA (US)

(72) Inventors: Robert Gaydos, Harleysville, PA (US); Weidong Mao, West Windsor, NJ (US); James Barkley, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 7 days.

(21) Appl. No.: 15/221,056

(22) Filed: Jul. 27, 2016

(65) Prior Publication Data

US 2018/0034789 A1   Feb. 1, 2018

(51) Int. Cl.
| | |
|---|---|
| *H04L 29/06* | (2006.01) |
| *H04N 21/222* | (2011.01) |
| *H04N 21/2347* | (2011.01) |
| *H04L 27/34* | (2006.01) |
| *H04L 65/612* | (2022.01) |
| *H04L 67/10* | (2022.01) |
| *H04L 67/568* | (2022.01) |

(52) U.S. Cl.
CPC .......... *H04L 63/0471* (2013.01); *H04L 27/34* (2013.01); *H04L 63/0281* (2013.01); *H04L 63/062* (2013.01); *H04L 63/068* (2013.01); *H04L 65/4084* (2013.01); *H04L 67/10* (2013.01); *H04L 67/2842* (2013.01); *H04N 21/222* (2013.01); *H04N 21/2347* (2013.01)

(58) Field of Classification Search
CPC . H04L 63/0471; H04L 63/0281; H04L 27/34; H04L 63/062; H04L 63/068; H04L 65/4084; H04L 67/10; H04L 67/2842; H04N 21/222; H04N 21/2347
See application file for complete search history.

(56) References Cited

U.S. PATENT DOCUMENTS

| | | | |
|---|---|---|---|
| 2007/0160208 A1* | 7/2007 | MacLean | H04N 7/1675 380/210 |
| 2008/0010207 A1* | 1/2008 | Yanagihara | H04L 9/0836 705/51 |
| 2009/0083279 A1* | 3/2009 | Hasek | H04L 67/2823 |
| 2010/0333209 A1* | 12/2010 | Alve | H04L 63/102 726/26 |
| 2011/0096924 A1 | 4/2011 | Candelore | |
| 2012/0254456 A1* | 10/2012 | Visharam | H04N 21/2343 709/231 |
| 2015/0281297 A1 | 10/2015 | Chamberlin et al. | |

* cited by examiner

*Primary Examiner* — Henry Tsang
(74) *Attorney, Agent, or Firm* — BakerHostetler

(57) ABSTRACT

Techniques for encrypting content in a content distribution network are disclosed. The content distribution network may comprise a number of national and local sites, and a number of hubs at each local sites. A content segment encrypting device may be operative at a local site to encrypt and cache segments of content. The segment encrypting device may provide the segments to streaming devices that encode content for delivery downstream to network or user devices.

17 Claims, 6 Drawing Sheets

SEGMENTED ENCRYPTION FOR CONTENT DELIVERY

BACKGROUND

In a typical configuration, a content distribution network encrypts media content and sends it, by a modulated signal, to an endpoint such as a cable modem, set-top box, cell phone, or other user device. The encrypted content is decrypted by those endpoints that have been authorized to access the content and, accordingly, have been provided with an appropriate key for decrypting the content.

The content distribution network typically relies upon a large number of devices to generate the modulated signals that are sent—typically at least one such signal to each endpoint. Content often originates at a national site, is distributed to one of a number of geographically distributed headend locations, and sent to a hub location comprising a number of devices that each interface with cable or fiber optic networks over which a modulated signal may be delivered. According to existing practices, the media content is encrypted by each of these devices just prior to transmission of the modulated signal.

SUMMARY

Disclosed herein are systems and methods that send media content over a distribution network using segmented content encryption.

Media content, such as video and audio, is typically encrypted when sent over a media distribution network in order to prevent unauthorized access to the media content. Some approaches to encrypting content, such as those that involve pre-encrypting the content for distribution over the network, involve periodic re-encryption in response to various events such as the encryption key being compromised or the encryption algorithm being changed. Other approaches to encrypting content, such as those involving encrypting a stream of content just prior to its transmission to a consumer device are inefficient when deployed in a large network.

Disclosed herein are procedures for distributing content wherein the content is encrypted by a segment encrypting device located at a local site of the distribution network, rather than relying upon the numerous hubs to perform encryption. A local site may be described as being located in a middle-tier of the distribution network, since it is neither located within one of the numerous hubs nor at a centralized point of the network, such as a national site.

In an example embodiment, the segment encryptor is located at a local site of a content distribution network, and provides content segments to a streaming device, sometimes referred to as a stream server, that converts the content segments into a signal for transmission to a consumer-facing endpoint such as a cable modem or set-top box. The content segments may be encrypted, by the segment encryptor, to restrict access to the content.

In an example embodiment, the headend content encryptor caches content segments so that the segments may be retrieved and included in video signals generated by a streaming device and transmitted to a consumer-facing endpoint such as a cable modem or set-top box. The content segments are addressable in the cache based on timing information associated with the content segments. The segment encryptor, when caching a content segment, stores a portion the content segment without encryption. The unencrypted portion of the content segment contains metadata that may be used by downstream components to transmit the content to a consumer-facing device. The remainder of the content segment may be stored with encryption.

Encrypted and unencrypted portions of the content segment are provided to the streaming device for conversion to a video signal and transmission of the signal to the consumer-facing device. The encrypted portions of the content are sent in the signal with the encryption applied by the segment encryptor. The unencrypted portions of the content, which are typically not useful independently of the encrypted portions, may be sent in the signal without encryption.

BRIEF DESCRIPTION OF THE DRAWINGS

The accompanying drawings, which are incorporated in and constitute a part of this specification, illustrate embodiments or various aspects thereof, and together with the description, serve to explain the principles of the methods, systems, and computer program products.

DETAILED DESCRIPTION

Figure 1:
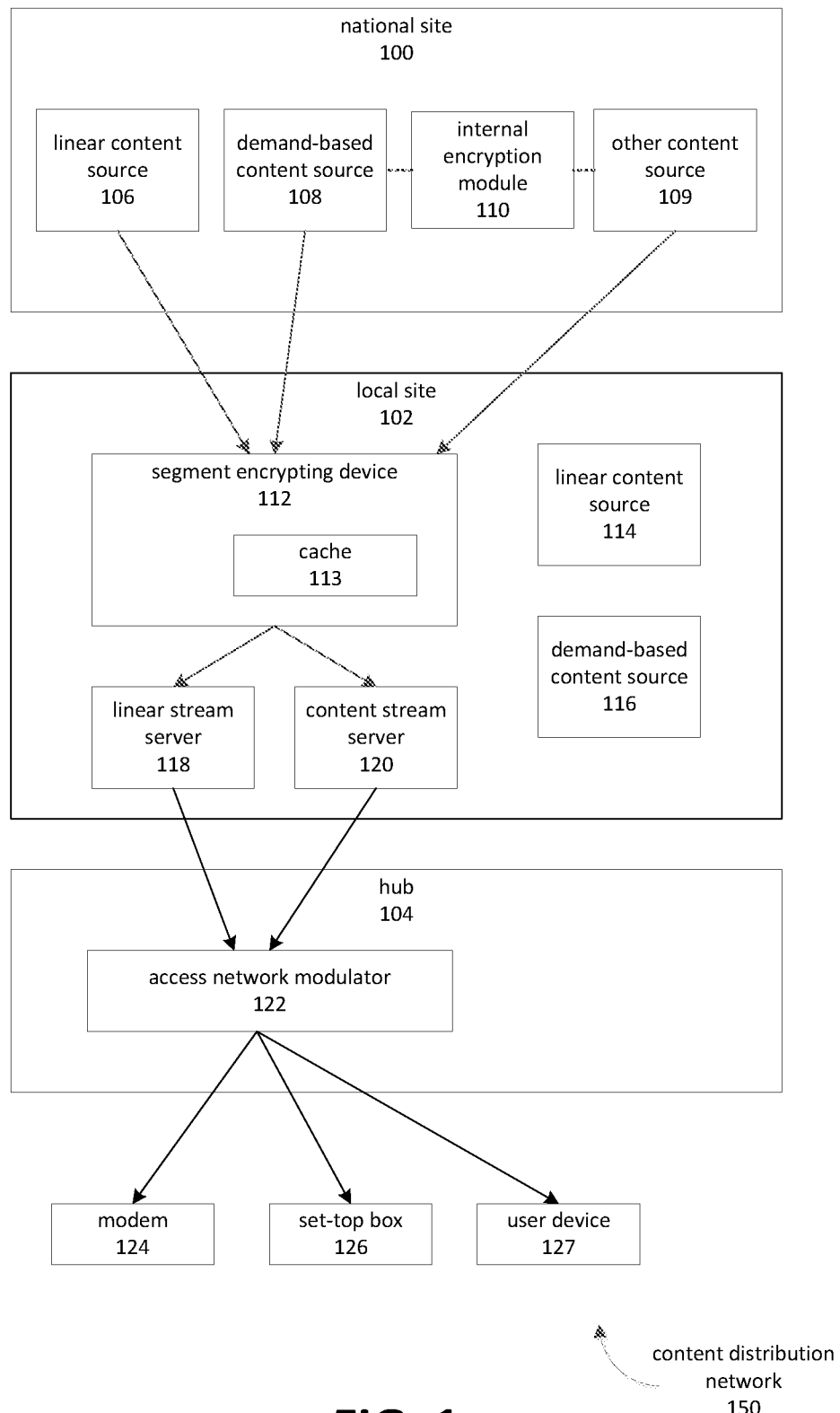
FIG. 1 is a block diagram depicting an example of a content distribution network.

An example distribution network may comprise one or more local or regional sites. The sites provide media content, e.g., via real time or on demand transmission technologies, to a number of local sites closer to clusters of users. At the local sites, e.g., headends in a hybrid fiber-coaxial ("HFC")-type network, computing devices such as stream servers convert content provided by the national site to a modulated signal or other transmission format, such as an Internet protocol ("IP")-based signal. The signal passes through circuitry at a hub location at which the signal enters a cable, fiber-optic, wireless, or hybrid network that is connected to a consumer-facing endpoint device, such as a user display device, gateway, modem, set-top box, etc. The end point device or user device decrypts the signal and presents the media content.

The signal transmitted from a hub to a consumer-facing endpoint may be encrypted to in order to prevent unauthorized access to the content. Encrypting the signal just prior to its transmission to the endpoint does not scale efficiently in a large network environment due to the typically large number of devices that may be used to generate and transmit the signals. Other approaches, such as encrypting the content at its source or pre-encrypting the content, may be inflexible or may impose excessive computational demands on a relatively small number of devices. For example, the consumer-facing endpoints may utilize different encryption keys or encryption mechanisms. Pre-encrypting the content may involve periodically re-encrypting the content in response to various events such as the compromise of an encryption key.

In a content distribution system disclosed herein, media content, such as audio and video content, is divided into segments prior to distribution. A segment encryptor operative at a local office, or edge, of the distribution network encrypts segments of media content. The segment encryptor provides the encrypted content segments to a computing device, such as a packager or stream server, which encodes the content and transmits it to an endpoint. For example, in an HFC-type network utilizing quadrature amplitude modulation ("QAM") to transmit content to user devices, a computing device, such as a package or stream server, might encode the content and transmit it as a modulated signal to an endpoint such as a content player, gateway, modem, set-top box, or other user device. In another example, a computing device, such as a package or stream server, might encode the content as IP-based messages and transmit the messages to an endpoint such as a content player, gateway, modem or set-top box, or other user device.

In an example embodiment, the segment encryptor caches the encrypted content segments. Because of its location at a local distribution facility, such as a headend, the segment encryptor may provide the encrypted content segments to a number of stream servers. As such, the content segments may at times be provided without retrieving the content segment again or reencrypting it.

The content segment may be stored in the cache in portions, which may include an encrypted portion and an unencrypted portion that contains metadata such as a presentation timestamp, a decoding timestamp, or other timing information. For example, the segment encryptor might inspect the packets within a segment and leave packets that contain packetized elementary stream ("PES") headers unencrypted.

In an example scenario, the segment encryptor provides a content segment, including both encrypted and unencrypted portions, to a streaming device, sometimes referred to as a stream server, upon a receipt of a request from a streaming device. A streaming device may, for example, request a content segment corresponding to a time $T_1$ for inclusion in a stream of content. The streaming device and segment encryptor may reference timing information associated with the content segment to initiate or respond to a request for a content segment. The streaming device may include both the encrypted and the unencrypted portions of the content segment in the signal it generates. However, these portions of the content may be sufficiently discontinuous, infrequent, or irregular to render the unencrypted portions unusable, by themselves, for purposes of viewing or listening to the content.

In some instances, additional content may be inserted into content provided by a national site. For example, in an HFC-type system a headend in California might insert localized advertisements into a television program provided by a national site. The localized advertisements may also be provided as segments and stored in the cache of the segment encryptor. In an example scenario, a stream server identifies a place in the television program at which the advertisement should be inserted, and requests content segments for the advertisement. The stream server then encodes the content segments for the advertisement into the stream of content being sent, by a signal, to an endpoint. For example, in an HFC-type system, the content might be sent via a modulated signal that may include the advertisement, whereas in other systems a sequence of IP-packets might include the advertisement. After the content segments for the advertisement have been sent, the stream server resumes requesting and encoding content segments for the television program. The stream server locates appropriate points for inserting the advertisement based on timing information associated with the content segments. The timing information may include, in some instances, timing information stored in the unencrypted portions of the content segments.

The location of the segment encryptor at a local site, such as at a headend, within the content delivery network offers the benefit of reducing various costs associated with encrypting content at other locations in the network. For example, encryption at or just prior to generation of a modulated signal in a HFC-type system would involve significantly more hardware, maintenance, and power costs as compared to performing encryption at a segment encryptor at a local site of the network. A similar issue might exist where an IP-based protocol is used to stream the content from the local site.

FIG. 1 is a block diagram depicting an example of a content distribution network. A content distribution network 150 may consist of a national site 100, a local site 102, and a hub 104. For simplicity in its depiction, FIG. 1 shows a single national site 100, local site (e.g., a headend in an HFC-type system) 102, and hub 104. However, the content distribution network 150 may comprise some number of each component. Typically, for each national site 100 in the content distribution network 150, there may exist a number of local sites 102, and for each local site 102, there may exist some number of hubs 104.

The national site 100 may comprise a linear content source 106, a demand-based content source 108, and other content source(s) 109. The linear content source 106 may provide content such as broadcast television or radio content. In some instances, the content may be multiplexed to include multiple channels of content.

The demand-based content source 108 may provide specific content, such as a particular movie or song, in response to a request to provide the specific content. The demand-based content source 108 may comprise a server or other computing device in communication with a storage device or storage area network, on which a variety of such content is stored. An internal encryption module 110 may encrypt the content for storage on the storage device or storage area network. The encryption employed by the internal encryption module 110 is distinct from encryption employed in other elements of the content distribution network 150. For example, the encryption applied by internal encryption module 110 may be transcrypted to a second encryption format that is compatible with and can be decrypted by a cable modem 124, set-top box 126, or user device 127. Transcrypting may involve converting encrypted data to another form of encryption, such as encryption with a different encryption method or with a different encryption key.

The other content source(s) 109 may include any other source of content. This may include content from a source such as from another content provider or another streaming service. This content may be provided to the national site 100 via an application programming interface ("API") or other ways.

It may be impractical to store content in the demand-based content source 108 such that it can be decrypted by a cable modem 124, set-top box 126, or user device 127. For example, if an encryption key is compromised, re-encrypting the content with a new encryption key may take a considerable amount of time due to the amount of content stored in the demand-based content source 108. The internal encryption applied by internal encryption module 110 may be less prone to being compromised because it is not exposed externally, i.e. to an external endpoint such as a modem 124, set-top box 126, or user device 127. Accordingly, by using encryption not exposed to an external endpoint, there may be a reduced chance of needing to re-encrypt content stored in the demand-based content source 108.

A local site 102 may receive content from a national site 100 for distribution to a hub 104. The local site 102 may also be associated with additional content sources, such as the depicted linear content source 114 or demand-based content source 116. The content from these sources may be provided for injection into content provided by the national site 100. For example, the demand-based content source 116 may contain advertisements that are to be inserted into a television program provided by a linear content source 106 at the national site 100. Typically, the advertisement would be injected into the television program at a specific time of the content provided by the national site 100.

At the local site 102, the segment encryptor 112 receives segments of content from a source at the national site 100 and either encrypts it in a format decodable by modem 124, set-top box 126, or user device 127, or transcrypts it from an internal encryption format to an encryption format that is decodable by modem 124, set-top box 126, or user device 127.

Segments of content may be provided by the national site 100 in response to a request initiated by a linear stream server 118 or a content stream server 120. For example, a linear stream server 118 may stream content to the modem 124, a user device 127 such as smartphone, a content player, a set-top box 126, etc. As it transmits the stream, the linear stream server may request segments of content from the segment encryptor 112. Servers may be implemented as any computing devices configured to implement transmission of content and other data. If the segment encryptor 112 is not able to immediately provide the requested segment, a request may be sent to the linear content source 106 at the national site to provide the segment. In some instances, the segment encryptor 112 or the linear stream server may send the request.

The content stream server 120 may similarly stream demand-based content (e.g., video on demand, interactive content, gaming, etc.) to a cable modem 124, set-top box 126, or user device 127. As with the linear stream server 118, the content stream server 120 or other content source 109 may obtain segments of content for streaming by requesting them from the segment encryptor 112, which may provide them from its cache 113 or request the segment from the demand-based content source 108.

The linear stream server 118, content stream server 120, or other content source 109 may convert segments to a signal, such as a modulated QAM signal or an IP-based content stream, containing both encrypted and unencrypted portions that generally corresponding to the encrypted and unencrypted content segment portions. In some cases, the linear stream server 118 may combine streams of content to form a multiplexed modulated signal or IP-based content stream. The content stream server 120 or other content source 109 might also combined streams of content in this manner. For example, multiple channels of content might be combined and transmitted over a single modulated signal, or over an IP-based stream of content in an all-IP network.

A hub 104 may comprise some number of access network modulators 122. An access network modulator 122 may interface with modems 124, set-top boxes 126, or other devices. The access network modulator 122 may adapt a signal sent from linear stream server 118 or content stream server 120 to a format compatible with an access network. In some instances, the access network module 122 may comprise a cable modem terminator. In other cases, such as when passive optical networks are employed, the access network modulator 122 may comprise an optical network terminator. The access network may include cable, optical fiber, phone lines, copper wire, or other communications media that comprise what is sometimes referred to as the "last mile" of a content distribution network 150. Typically, the "last mile" of the content distribution network 150 includes communications media extending into a customer's premises. In some instances, the access network may comprise a terminating coaxial cable which connects to a cable modem 124, set-top box 126, user device 127, etc.

A cable modem 124, set-top box 126, or other device may include devices that receive a signal from an access network modulator 122. The cable modem 124, set-top box 126, user device 127, or other device may distributed the content within an on-premises network, or cause the content to be played on a television, stereo, smartphone, tablet, or other media device. A cable modem 124, set-top box 126, user device 127, or other device may comprise, for example, a cable modem terminator or optical network terminator, or other circuitry compatible with the signal transmitted by the access network modulator 122. In some cases, the cable modem 124, set-top box 126, user device 127 or other device (such as a cell phone, tablet, laptop computer, etc.) may comprise software for receiving the signal transmitted by the access network modulator 122. The signal transmitted by the access network modulator 122 may, in some instances, comprise a QAM-type signal. In other cases, for example, the signal may comprise data forming an IP-compatible protocol for broadcasting audiovisual data.

The segment encryptor 112 may receive the segments of content provided by the national site 100 and encrypt the received segment. In some instances, the segment encryptor may encrypt a portion of the segment and store it, and a second, unencrypted portion of the segment, in a cache 113. The encrypted portion may be encrypted or transcrypted to a format decodable by modem 124, set-top box 126, user device 127, or other device that may receive that may receive the signal. The unencrypted portion may comprise timing information. In some instances, the unencrypted portion may contain header information pertinent to the encrypted portion of the segment of content.

In response to a request to obtain a content segment from the cache 113, the segment encryptor 112 may reference timing information associated with the content. The timing information may be obtained from a manifest file associated with the content segment. A request to obtain a content segment may include information indicating a timeframe for the requested content segment. For example, the request may indicate that it is a content segment containing content from time $T_1$ to $T_2$. The segment encryptor 112 may determine that it has access to a cached version of the content segment. The cached version may include an encrypted portion of the content segment and an unencrypted portion of the content segment. The unencrypted portion may contain metadata that may be used by the linear stream server 118, content stream server 120, or other content source(s) 109 to regulate transmission of content to a cable modem 124, set-top box 126, user device 127, or other device. The metadata may, for example, include information about the length of time the content segment represents. The linear stream server 118, content stream server 120, or other content source 109 may use this information to regulate transmission of the content to the modem 124, set-top box 126, user device 127, or other device, such that the recipient of the signal has a sufficient amount of content and is not overwhelmed content transmitted too rapidly for the modem 124, set-top box 126, user device 127, or other device to process.

Both the encrypted and unencrypted portions of the content stream may be transmitted to the modem 124, set-top box 126, user device 127, or other device. The unencrypted portion of the content segment may contain data in addition to metadata, such as frames of video content. The inclusion of unencrypted portions of content in the stream of content sent to the modem 124, set-top box 126, user device 127, or other recipient device may not compromise the encryption of the stream as a whole, since the unencrypted portions included in the stream may correspond to disjointed or irregular points in the content, and would not typically be combinable to produce a usable version of the original content.

Figure 2:
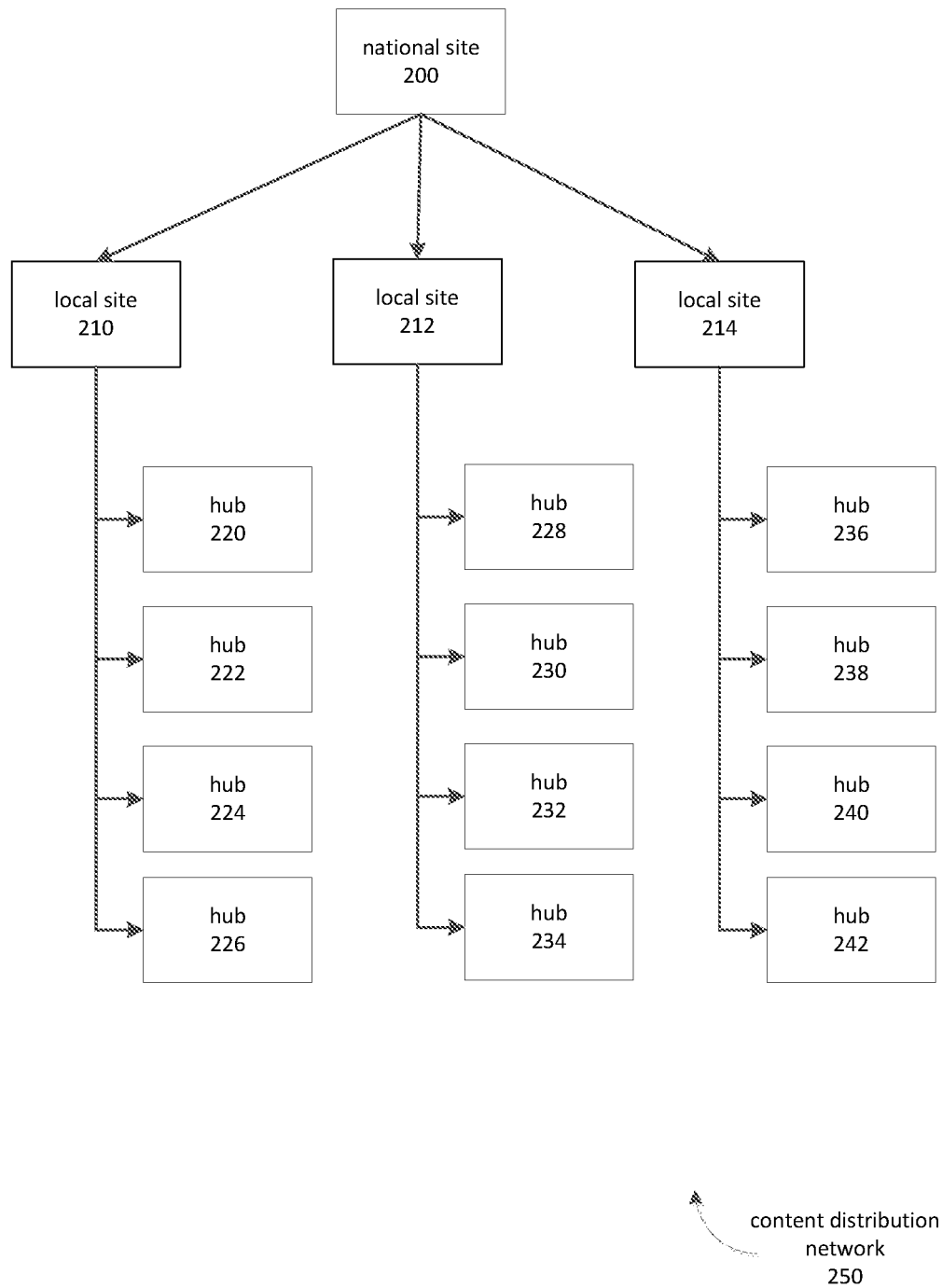
FIG. 2 is a block diagram depicting a scaled-out content distribution network.

As depicted by FIG. 1, the segment encryptor 112 may be located at local site 102, such that it receives unencrypted content (or content encrypted in an internal encryption format) from a national site 100 and transmits encrypted content to a hub 104 for transmission to an endpoint cable modem 124 or set-top box 126, or user device 127. This arrangement permits increased scaling efficiency compared to other encryption techniques. FIG. 2 is a block diagram depicting a scaled-out content distribution network. As shown in FIG. 2, a content distribution network 250 may comprise a national site 200, local sites/offices or distribution facilities 210-214, and hubs 220-242. Each of the hubs 220-242 may stream content to a consumer-facing endpoint such as a cable modem or router.

The number of hubs 220-242 in the content distribution network 250 greatly exceeds that of the number of local sites 210-214 or national site 200. Accordingly, scaling efficiency may be achieved by encrypting content segments at the local sites 210-214, rather than at the hubs 220-224. Additional operating efficiency may be associated with operation of a cache of the content segments at each of the local sites 210-214.

Figure 3:
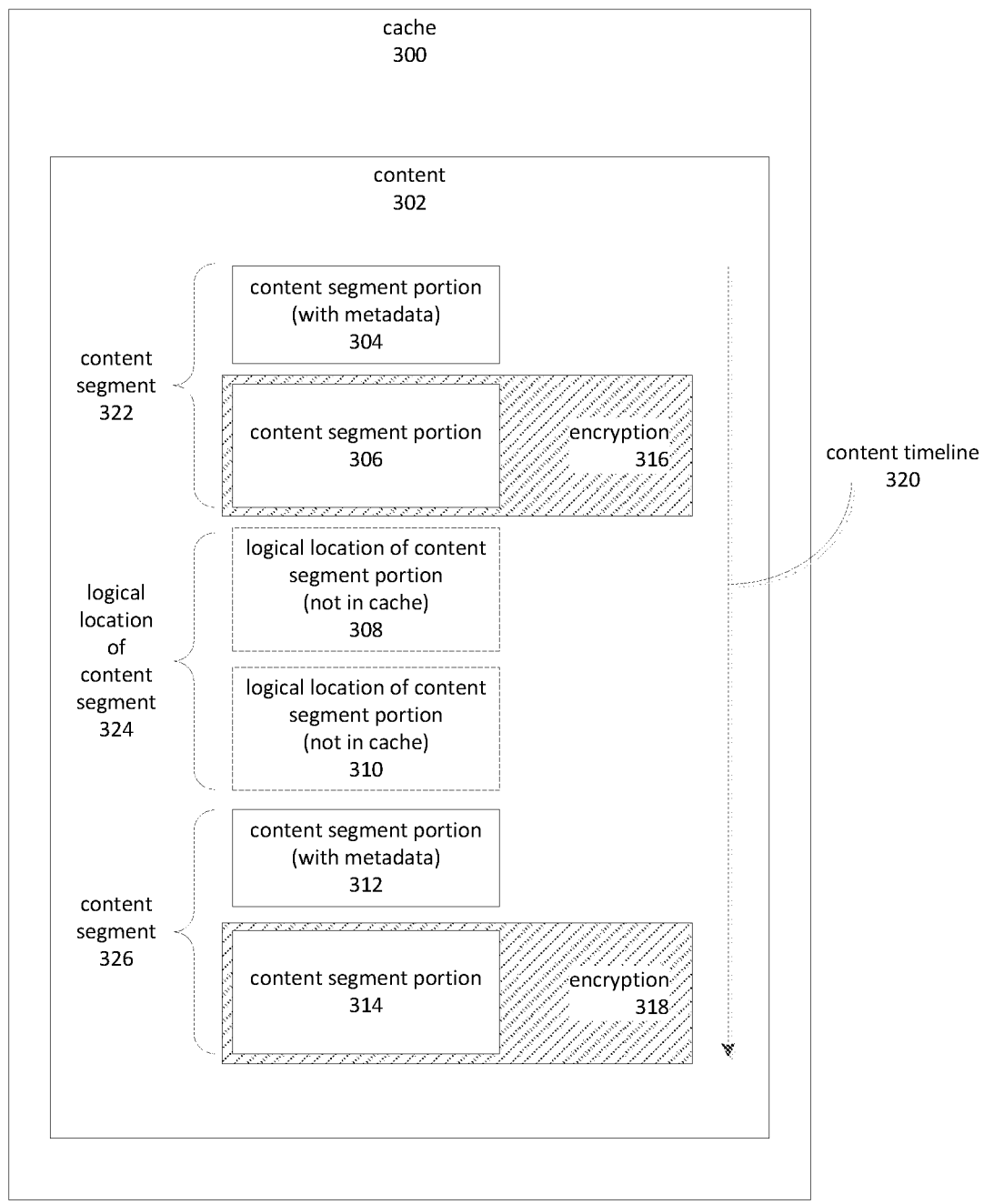
FIG. 3 depicts a cache of content segments maintained at a headend of a content distribution network.

FIG. 3 depicts a cache of content segments maintained at a local distribution facility, which may be referred to as a local site, of a content distribution network. A local site may, for example, comprise a headend of a HFC-type network. A cache 300 may comprise one or more memories on which the data structures depicted in FIG. 3 are stored. The memories may include, in various aspects, random access memory, solid state drivers, magnetic drives, and so forth. The memories may be arranged so that content segments in the cache 300 are associated by other segments from the same media content. For example, as depicted in FIG. 3, segments 304-314 might all pertain to a content 302. The content 302 might be for a television program, movie, advertisement, game, interactive content, audio, etc.

Content segments 322-326 for content 302 may be received from a content source such as, for example, the linear content source 106 at national site 100 and stored in the cache 300 linked to other content segments pertaining to content 302. A content segment 322 may be stored in the cache as two or more portions. For example, a content segment 322 might be stored as a first content segment portion 304 that contains metadata such as timing information for the content segment, and a second content segment portion 306 that is stored with encryption 316. The encryption 316 may be decodable by an endpoint device of a content distribution network, such as a cable modem or set-top box. As depicted by FIG. 3, a second content segment 326 may have been downloaded and stored as two content segment portions 312-314. The first content segment portion 312 may contain metadata and be stored without encryption, and the content segment portion 314 may be stored with encryption 318.

The cache 300 may store discontinuous portions of content 302. For example, FIG. 3 depicts using dotted lines a logical location for a content segment 324 that has not yet been received in the cache and that falls between two other downloaded content segments 322, 326 on the content timeline 320. The content timeline 320 is representative of the temporal order of the content. For example, an ordinary viewing of a movie or television program corresponding to content 302 might proceed in the direction indicated by content timeline 320.

The content segments 322, 326 that have been downloaded may be stored in cache 300 in a manner that facilitates access to the segments according to the content timeline 320. For example, the content segments 322, 326 may have been downloaded in any order, but may, in some instances, be retrieved in an order that facilitates playback in the order indicated by the content timeline 320.

The cache 300 may also be able to determine that the content segment 324 of the content 302 is not yet available in the cache 300. The determination may be made using timing information associated with each content segment. The timing information may be stored with or linked to the content segment portions stored in the cache 300. Using the timing information, it may be determined which segments of the content timeline 320 have corresponding segments available in the cache, and which segments of the content timeline 320 are missing. It may then be determined that a content segment corresponding to the logical location of content segment 324 has not yet been downloaded when the corresponding content segment falls within the segment of the content timeline 320 for which segments are missing from the cache 300.

Note that although FIG. 3 depicts content segment portions 304-306, 312-314 and the logical locations of content segments 308-310 as grouped within content 302 and ordered by content timeline 300, the depicted grouping and ordering should not be construed as limiting the scope of the present disclosure. For example, content segment portions stored within cache 300 may not necessarily be stored in a group or ordered according to a timeline. In some instances, each content segment portion may be viewed as an independent unit of data that may be stored or retrieved based on properties such as content time, encryption method, and encryption key.

The cache 300 may store copies of the same segment of data that are encrypted with different encryption keys. For example, different versions of user devices, content players, modems or set-top boxes might employ different encryption keys to decrypt content, or new encryption keys might be periodically rolled out. In order to be decrypted, the content segments provided to the modems or set-top boxes are encrypted with a corresponding encryption key. A similar circumstance may arise when different devices, content players, modems, set-top boxes, etc. employ different encryption schemes. When a content segment is requested, the cache 300 may indicate whether or not copies of the content segment contained within the cache 300 were encrypted with a matching encryption key and/or encryption algorithm. If not, an additional copy may be encrypted or transcrypted with the matching key and stored in the cache 300.

Encryption keys may be periodically invalidated. In response to receiving information indicating that an encryption key has been invalidate, content segment portions that were encrypted using the invalidated key may be removed from the cache and then subsequently replaced with a content segment portion encrypted with a valid encryption key. Alternatively, a content segment portion encrypted with an invalidated encryption key may be transcrypted with a valid encryption key.

In some instances, an encryption key may be provided to an endpoint such as a user device, content player, modem, set-top box, etc. The encryption key may be transmitted to the endpoint by an in-band or out-of-band transmission. The transmission may, for example, be originated by a segment encryptor or streaming server when a previous encryption key has been invalidated or when it is determined that an endpoint is not in possession of a key that is usable to decrypt content segments that are to be sent to the endpoint by the streaming server. The transmission may be directed to an endpoint over the content distribution network. In some instances, access to the encryption key may be controlled by a digital rights management technique. For example, the encryption key may be included in a cipher which is transmitted to the endpoint and is decryptable by a shared secret. In another example, the endpoint is notified of a change to the encryption key and may request access to the new encryption key. The key may then be provided to the endpoint if the endpoint has sufficient access rights.

Figure 4:
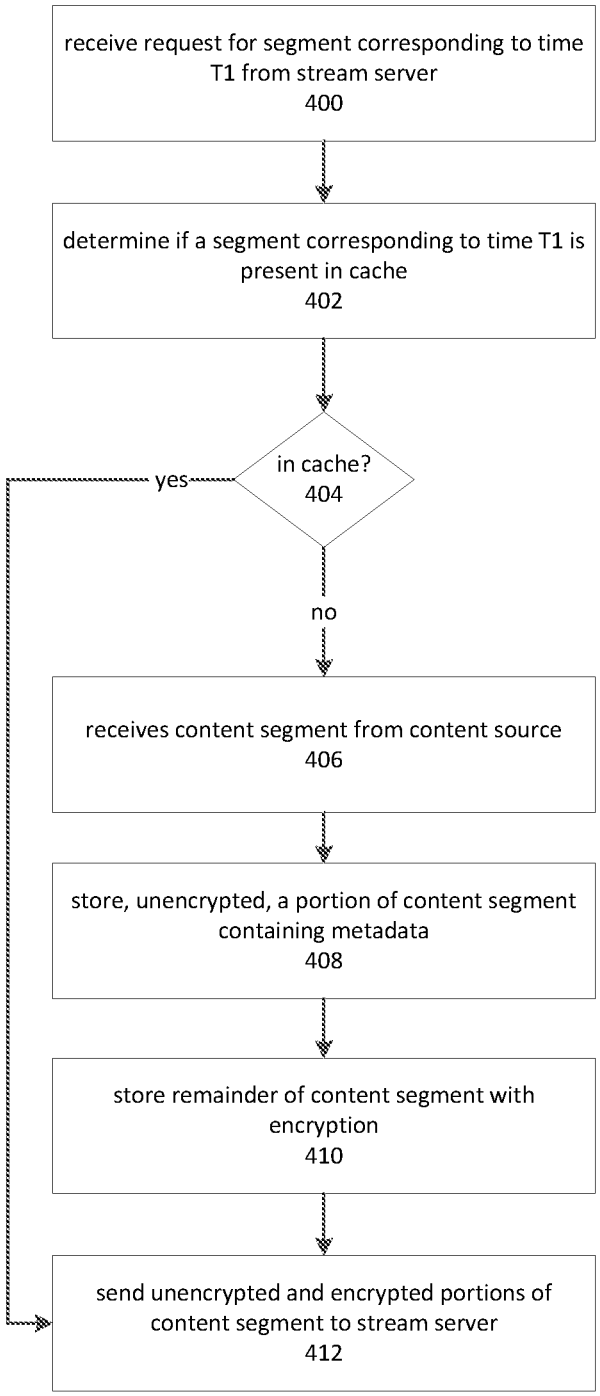
FIG. 4 is a flow diagram depicting an example of a process for distributing content.

FIG. 4 is a flow diagram depicting an example process for distributing content. Although depicted as a sequence of blocks, the disclosed process should not be construed as limiting the scope of the present disclosure to embodiments adhering to the depicted sequence. In various cases, aspects, and embodiments, at least some of the blocks and depicted operations may be altered, omitted, reordered, or performed in parallel.

At block 400, a computing device such as the segment encrypting device 112 may receive a request to provide a content segment corresponding to a content time, or content time period, of $T_1$. A content segment may correspond to a content time when the segment contains content that would be played as of the specified content time. For example, a content time of 1:02 might correspond to a segment of content that begins at the 1:00 point in the content and ends at the 1:10 point.

The request may be received from a stream server, such as the linear stream server 118 or the content stream server 120 depicted in FIG. 1. The request may, for example, comprise information indicating what content is to be accessed and information indicative of which content segment is being requested. For example, the request might include an identifier such as a content file name and time information, such as the time $T_1$ of the requested segment or a time $T_0$ of a segment previously received by the stream server. In some instances, a time period may be requested.

At block 402, the segment encrypting device 112 may determine if a segment corresponding to time $T_1$ is present in a memory, e.g., the cache 113. The segment encrypting device 112 may base the determination on timing information maintained in the cache 300. The timing information may include information such as the start time and end time (or length) of the content segment. The timing information for a content segment may be linked, in the cache 300, to both the corresponding encrypted portion of the content segment and the unencrypted portion.

If the requested content segment 322 is located in the cache 113, the content segment 322 may be sent from the segment encrypting device 112 to a stream server 118, 120, as depicted by the branch at block 404 and the operations depicted by block 412. If the request content segment is not located in the cache 113, a request may be sent to a content source, such as the linear content source 106 or the demand-based content source 108 depicted in FIG. 1, to provide the segment to the segment encrypting device 112. In some instances, the content encrypting device 112 may transmit the request to the content source upon determining that a requested segment has not been saved to the cache. In other instances, the requesting stream server may transmit the request directly to the content source, which may then transmit the requested content segment to the segment encrypting encrypting device 112.

At block 406, the segment encryptor may receive the requested content segment from the content source. For example, in response to a request to transmit a content segment corresponding to time $T_1$, the demand-based content source 108 at the national site 100 may transmit the content segment 322 to the segment encrypting device 112 at the local site 102. The segment encrypting device 112 may then processed the received content segment 322, as described in blocks 408-412.

At block 408, the segment encrypting device 112 may store a portion of the content segment 322 that contains metadata in the cache 113. The metadata may contain timing information such as is used in block 402 to determine if a content segment has already been placed in the cache. This portion of the content segment 322 may be stored without encryption.

Block 410 depicts the segment encrypting device 112 storing the remainder of the content segment 322 with encryption. The encrypted portion of the content segment 322 may be stored in the cache 113 with an association to the unencrypted portion of the content segment 322, such that the encrypted portion may be located based on timing information or other identifying indicia.

At block 412, the segment encrypting device 112 may transmit both portions of the content segment to a stream server 118, 120. The unencrypted portions may be short, infrequent, or irregularly spaced within the content. As such, the lack of encryption for these portions of the content does not compromise the security of the content as a whole. Note that in some cases, a content segment may be downloaded and stored entirely as an encrypted segment. A content segment may be stored entirely encrypted when the particular content segment does not contain metadata. In other instances, the segment encryptor may determine to store timing information or other metadata in unencrypted content segment portions less often than the information occurs in the content.

Upon receipt of the encrypted and unencrypted portions of the content segment, a stream server such as a linear stream server 118 or content stream server 120 may include the portions in a stream of content sent to an endpoint such as a cable modem or set-top box. The stream server may convert the segments to a QAM signal containing both encrypted and unencrypted portions, generally corresponding to the encrypted and unencrypted content segment portions.

Figure 5:
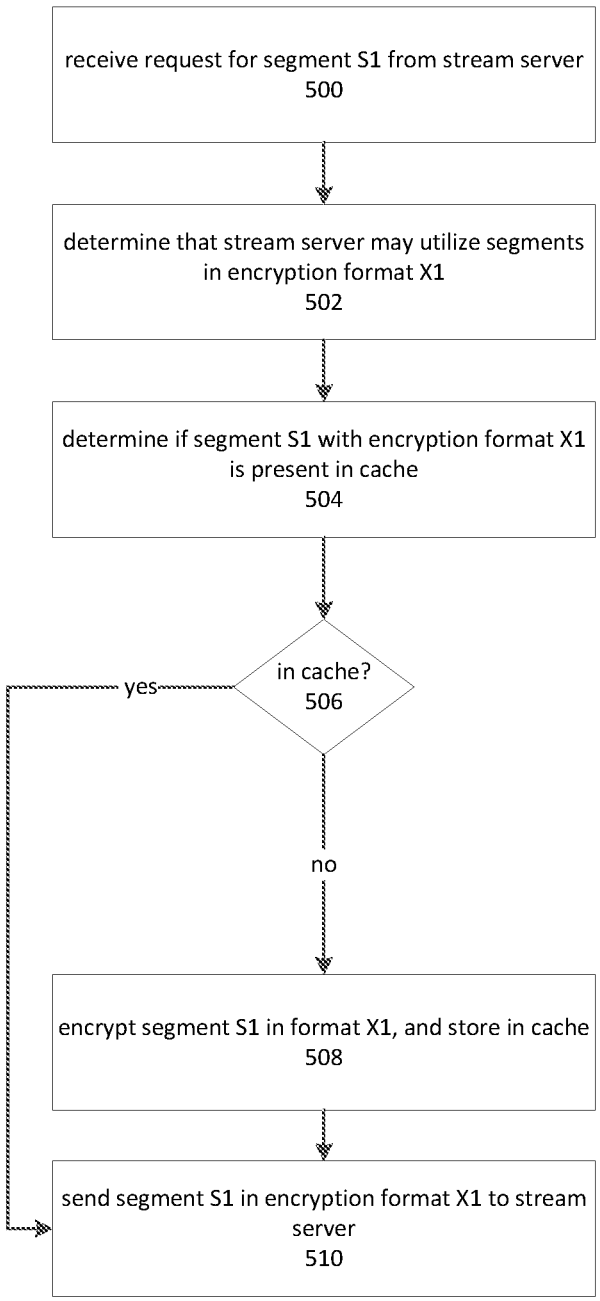
FIG. 5 is a flow diagram depicting an additional example of a process for distributing content.

FIG. 5 is a flow diagram depicting an additional example of a process for distributing content. Although depicted as a sequence of blocks, the depicted sequence should not be construed as limiting the scope of the present disclosure to embodiments adhering to the depicted sequence. In various cases, aspects, and embodiments, at least some of the blocks and depicted operations may be altered, omitted, reordered, or performed in parallel.

At block 500, a segment encrypting device 112 may receive a request to provide a content segment from a stream server, such as a linear stream server 118 or content stream server 120. The request may include information indicating that the requested content segment $S_1$ should correspond to a time $T_1$. This content segment, for exemplary purposes, may be designated as content segment $S_1$.

At block 502, the segment encrypting device 112 may identify an encryption format that is compatible with the intended recipient of the stream of content being sent from the stream server to an endpoint, such as a modem 124 set-top box 126, or user device 127. For exemplary purposes, the compatible encryption format may be designated $X_1$. For example, the segment encrypting device 112 might determine that the cable modem 124, set-top box 126, or user device 127, is in possession of an encryption key that allows it to decrypt content that is encrypted with format $X_1$.

At block 504, the segment encrypting device 112 may determine that the content segment $S_1$ has been downloaded and stored in the cache using the encryption format $X_1$. As may be seen from blocks 506 and 510, the content segment $S_1$ may be sent to the stream server if it has already been downloaded to the cache and has been stored in the encryption format $X_1$.

It may be the case that content segment $S_1$ has been downloaded and stored in the cache 113, but in an encryption format other than $X_1$. This might occur, for example, if a stream server had been transmitting content to an endpoint that has a different encryption key. In this case, the segment encrypting device 112 would encrypt and store content segments in this format as segments destined for that endpoint were received. The cache 113 may contain multiple copies of segment $T_1$, each stored using a different encryption format.

At block 508, the segment encrypting device 112 may encrypt the segment in encryption format $X_1$. In some instances, the content segment $S_1$ may be downloaded again from its content source and encrypted again, this time in format $X_1$. In other instances, the segment encrypting device 112 might transcrypt the encrypted portions of content $X_1$ to the other format and store the newly encrypted version in the cache along with the other version. In another instance, the segment encrypting device 112 might store an unencrypted copy of the segment $S_1$ in the cache along with any encrypted versions of it.

At block 510, the version of the content segment $S_1$ that has been encrypted in encryption format $X_1$ may be transmitted to a stream server, where it may be included in a signal sent to an endpoint. The signal may, for example, correspond to a modulated QAM signal or an IP-based content stream. The stream server may use metadata, such as time and length information, included in the unencrypted portions of the content to regulate transmission of the signal. As such, the stream server does not require access to the encryption key.

Figure 6:
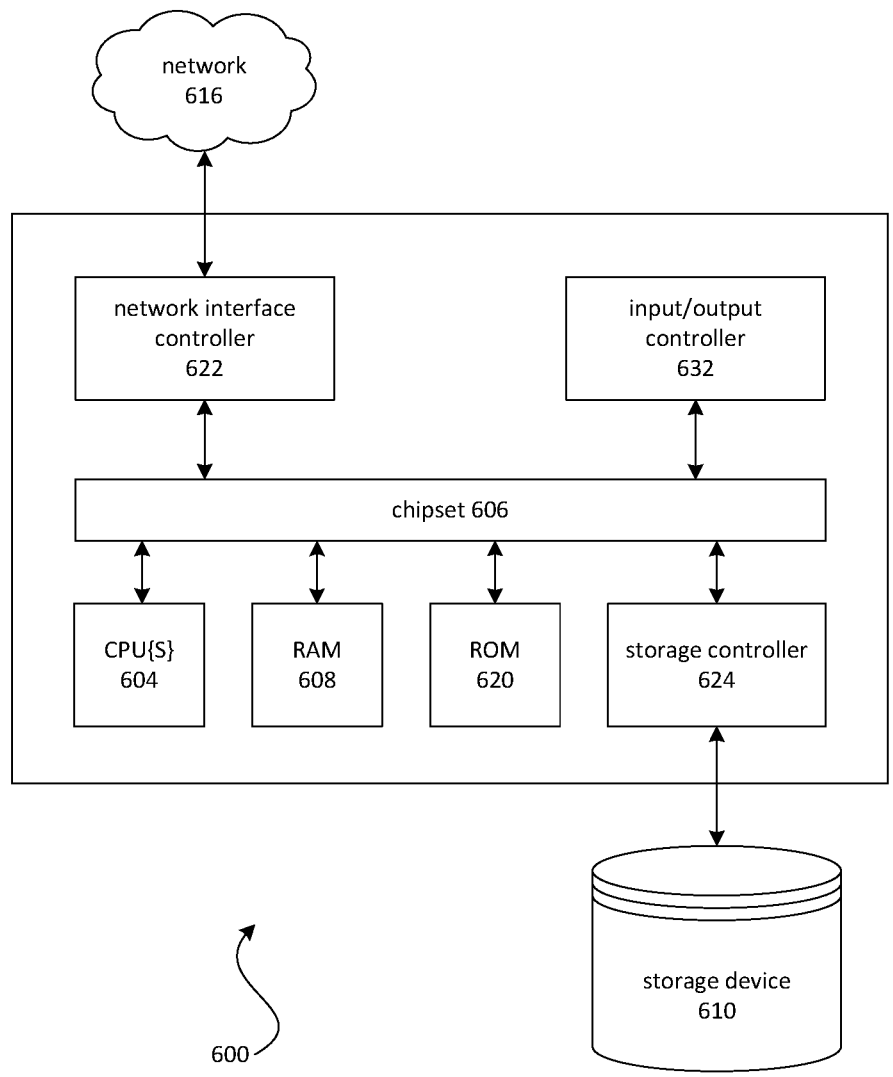
FIG. 6 is a block diagram of an example computer.

FIG. 6 depicts a computing device that may be used in various aspects of the present disclosure. The computer architecture shown in FIG. 6 illustrates a computing device. This may include a server, desktop computer, network appliance, or other computing device, and may be utilized to execute any aspects of the computers described herein, such as, for example, to implement the operating procedures of FIGS. 4 and 5.

Computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. CPU(s) 604 may be standard programmable processors that perform arithmetic and logical operations necessary for the operation of computing device 600.

CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

CPU(s) 604 may, in various embodiments, be augmented with or replaced by other processing units, such as GPU(s) 605. GPU(s) 605 may comprise processing units specialized for but not necessarily limited to highly parallel computations, such as graphics and other visualization-related processing.

Chipset 606 may provide an interface between CPU(s) 604 and the remainder of the components and devices on the baseboard. Chipset 606 may provide an interface to a random access memory (RAM) 608 used as the main memory in computing device 600. Chipset 606 may further provide an interface to a computer-readable storage medium, such as a read-only memory (ROM) 620 or non-volatile RAM (NVRAM) (not shown), for storing basic routines that may help to start up computing device 600 and to transfer information between the various components and devices. ROM 620 or NVRAM may also store other software components necessary for the operation of computing device 600 in accordance with the aspects described herein.

Computing device 600 may operate in a networked environment using logical connections to remote computing nodes and computer systems through local area network (LAN) 816. Chipset 606 may include functionality for providing network connectivity through a network interface controller (NIC) 622, such as a gigabit Ethernet adapter. NIC 622 may be capable of connecting the computing device 600 to other computing nodes over network 616. It should be appreciated that multiple NICs 622 may be present in computing device 600, connecting the computing device to other types of networks and remote computer systems.

Computing device 800 may be connected to a mass storage device 628 that provides non-volatile storage for the computing device 600. Mass storage device 628 may store system programs, application programs, other program modules, and data, which have been described in greater detail herein. Mass storage device 628 may be connected to computing device 600 through a storage controller 624 connected to chipset 606. Mass storage device 628 may consist of one or more physical storage units. Storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computing device 600 may store data on mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 628 is characterized as primary or secondary storage and the like.

For example, computing device 600 may store information to mass storage device 628 by issuing instructions through storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computing device 600 may further read information from mass storage device 628 by detecting the physical states or characteristics of one or more particular locations within the physical storage units.

In addition to mass storage device 628 described above, computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

Mass storage device 628 may store an operating system utilized to control the operation of the computing device 600. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. Mass storage device 628 may store other system or application programs and data utilized by computing device 600.

Mass storage device 628 or other computer-readable storage media may also be encoded with computer-executable instructions, which, when loaded into computing device 600, transforms the computing device from a general-purpose computing system into a special-purpose computer capable of implementing the aspects described herein. These computer-executable instructions transform computing device 600 by specifying how CPU(s) 604 transition between states, as described above. Computing device 600 may have access to computer-readable storage media storing computer-executable instructions, which, when executed by computing device 600, may perform operating procedures depicted in FIGS. 4 and 5.

A computing device 600 may also include an input/output controller 632 for receiving and processing input from a number of input devices, such as a keyboard, a mouse, a touchpad, a touch screen, an electronic stylus, or other type of input device. Similarly, input/output controller 632 may provide output to a display, such as a computer monitor, a flat-panel display, a digital projector, a printer, a plotter, or other type of output device. It will be appreciated that computing device 600 may not include all of the components shown in FIG. 6, may include other components that are not explicitly shown in FIG. 6, or may utilize an architecture completely different than that shown in FIG. 6.

As described herein, a computing device may be a physical computing device, such as computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices disclosed herein. It is intended that the specification and example figures be considered as exemplary only, with a true scope and spirit being indicated by the following claims.

What is claimed is:
1. A method comprising:
receiving, from a streaming server associated with a content distribution network, a request for a content segment associated with a time period in a content stream;

determining an encryption format that is compatible with an endpoint device that is an intended recipient for the content segment, wherein the determining the encryption format that is compatible with the endpoint device comprises determining that the endpoint device possesses an encryption key that allows it to decrypt content when encrypted in the encryption format;

generating, for the content segment:
one or more encrypted portions of content that are encrypted in the encryption format, and
an unencrypted portion of content indicating timing information for the one or more encrypted portions of content;

storing, in a cache associated with the content distribution network, the unencrypted portion of content and the one or more encrypted portions of content; and sending, to the streaming server, the unencrypted portion of content and the one or more encrypted portions of content to cause decryption and playback, by the endpoint device, of the requested content segment.

2. The method of claim 1, further comprising:
sending, to the endpoint device, an encryption key usable to decrypt the one or more encrypted portions of content, wherein access to the encryption key is controlled by digital rights management.

3. The method of claim 2, wherein the sending comprises sending, to the endpoint device via an in-band or out-of-band channel, the encryption key.

4. The method of claim 1, further comprising:
receiving information indicative of an invalidated encryption key;
removing the one or more encrypted portions of content from the cache based on the receiving information indicative of the invalidated encryption key, wherein the at least one encrypted portion of content was encrypted using the invalidated encryption key.

5. The method of claim 1, wherein the one or more encrypted portions of content comprise copies of a same portion of the content segment that are encrypted in the encryption format and at least one additional encryption format.

6. The method of claim 1, wherein the timing information comprises at least one of a presentation timestamp, a decoding timestamp, or a packetized elementary stream (PES) header.

7. A device comprising:
one or more processors; and
memory storing instructions that, when executed by the one or more processors, cause the device to:
receive, from a streaming server associated with a content distribution network, a request for a content segment associated with a time period in a content stream;
determine an encryption format that is compatible with an endpoint device that is an intended recipient for the content segment, wherein the determining the encryption format that is compatible with the endpoint device comprises determining that the endpoint device possesses an encryption key that allows it to decrypt content when encrypted in the encryption format;
generate, for the content segment:
one or more encrypted portions of content that are encrypted in the encryption format, and
an unencrypted portion of content indicating timing information for the one or more encrypted portions of content;
store, in a cache associated with the content distribution network, the unencrypted portion of content and the one or more encrypted portions of content; and
send, to the streaming server, the unencrypted portion of content and the one or more encrypted portions of content to cause decryption and playback, by the endpoint device, of the requested content segment.

8. The device of claim 7, wherein the instructions, when executed by the one or more processors, further cause the device to:
send, to the endpoint device, an encryption key usable to decrypt the one or more encrypted portions of content, wherein access to the encryption key is controlled by digital rights management.

9. The device of claim 8, wherein the sending comprises sending, to the endpoint device via an in-band or out-of-band channel, the encryption key.

10. The device of claim 7, wherein the instructions, when executed by the one or more processors, further cause the device to:
receive information indicative of an invalidated encryption key;
remove the one or more encrypted portions of content from the cache based on the receiving information indicative of the invalidated encryption key, wherein the at least one encrypted portion of content was encrypted using the invalidated encryption key.

11. The device of claim 7, wherein the one or more encrypted portions of content comprise copies of a same portion of the content segment that are encrypted in the encryption format and at least one additional encryption format.

12. The device of claim 7, wherein the timing information comprises at least one of a presentation timestamp, a decoding timestamp, or a packetized elementary stream (PES) header.

13. A non-transitory computer-readable storage medium storing computer-readable instructions that, when executed by a processor, cause:
receiving, from a streaming server associated with a content distribution network, a request for a content segment associated with a time period in a content stream;
determining an encryption format that is compatible with an endpoint device that is an intended recipient for the content segment, wherein the determining the encryption format that is compatible with the endpoint device comprises determining that the endpoint device possesses an encryption key that allows it to decrypt content when encrypted in the encryption format;
generating, for the content segment:
one or more encrypted portions of content that are encrypted in the encryption format, and
an unencrypted portion of content indicating timing information for the one or more encrypted portions of content;
storing, in a cache associated with the content distribution network, the unencrypted portion of content and the one or more encrypted portions of content; and
sending, to the streaming server, the unencrypted portion of content and the one or more encrypted portions of content to cause decryption and playback, by the endpoint device, of the requested content segment.

14. The non-transitory computer-readable storage medium of claim 13, further storing computer-readable instructions that, when executed by the processor cause:

sending, to the endpoint device, an encryption key usable to decrypt the one or more encrypted portions of content, wherein access to the encryption key is controlled by digital rights management.

15. The non-transitory computer-readable storage medium of claim 13, further storing computer-readable instructions that, when executed by the processor cause:

receiving information indicative of an invalidated encryption key;

removing the one or more encrypted portions of content from the cache based on the receiving information indicative of the invalidated encryption key, wherein the at least one encrypted portion of content was encrypted using the invalidated encryption key.

16. The non-transitory computer-readable storage medium of claim 13, wherein the one or more encrypted portions of content comprise copies of a same portion of the content segment that are encrypted in the encryption format and at least one additional encryption format.

17. The non-transitory computer-readable storage medium of claim 13, wherein the timing information comprises at least one of a presentation timestamp, a decoding timestamp, or a packetized elementary stream (PES) header.

* * * * *